(12) United States Patent
Gerbrandt et al.

(10) Patent No.: US 10,206,322 B2
(45) Date of Patent: Feb. 19, 2019

(54) BRAKING SYSTEM FOR TOWED VEHICLES

(71) Applicant: Bourgault Industries Ltd., St. Brieux (CA)

(72) Inventors: Scott Gerbrandt, St. Brieux (CA); Scot Jagow, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 313 days.

(21) Appl. No.: 15/075,879

(22) Filed: Mar. 21, 2016

(65) Prior Publication Data

US 2016/0311280 A1 Oct. 27, 2016

(30) Foreign Application Priority Data

Apr. 22, 2015 (CA) ..................................... 2889117

(51) Int. Cl.
*B60T 7/20* (2006.01)
*A01B 59/00* (2006.01)
(Continued)

(52) U.S. Cl.
CPC .......... *A01B 59/002* (2013.01); *A01B 59/042* (2013.01); *B60D 1/145* (2013.01);
(Continued)

(58) Field of Classification Search
CPC . B60T 7/20; B60T 8/708; B60T 8/323; B60T 11/108; B60D 1/242
(Continued)

(56) References Cited

U.S. PATENT DOCUMENTS 2,258,876 A 10/1941 Banning, Jr.
2,463,896 A * 3/1949 Messier ................ B60T 11/107
188/112 R
(Continued)

FOREIGN PATENT DOCUMENTS

CA 2598319 A1 2/2009
CA 2889117 A1 10/2016
EP 2 163 446 A1 3/2010

OTHER PUBLICATIONS

Australian Examination Report No. 1 for Standard Patent Application, dated Mar. 31, 2017 for Application No. AU 2016201486, 6 pgs.
(Continued)

*Primary Examiner* — Joseph M Rocca
*Assistant Examiner* — Daniel S Yeagley
(74) *Attorney, Agent, or Firm* — Frost Brown Todd LLC

(57) ABSTRACT

A towed vehicle hitch tongue includes movably connected front and rear tongue members, and a fully exposed master cylinder connected at opposite ends thereof to the tongue members such that a rearward force urging the front tongue member toward the rear tongue member forces pressurized braking fluid out of a port thereof into a braking circuit configured to exert a braking force. The braking circuit prevents braking until the rearward force warrants braking, provides dampening of the brake action, allows the towed vehicle to reverse, and can provide emergency stopping and dampening of movement of the hitch tongue. Instead of using movable front and rear tongue members, sensors can detect what the towed vehicle is doing, and apply appropriate braking force in response.

6 Claims, 7 Drawing Sheets

(51) Int. Cl.
*B60T 13/08* (2006.01)
*B60T 13/66* (2006.01)
*B60T 13/68* (2006.01)
*B60D 1/145* (2006.01)
*A01B 59/042* (2006.01)

(52) U.S. Cl.
CPC .............. *B60T 7/20* (2013.01); *B60T 13/08* (2013.01); *B60T 13/662* (2013.01); *B60T 13/686* (2013.01)

(58) Field of Classification Search
USPC ............... 188/3 H, 141, 24.22, 24.14, 9
See application file for complete search history.

(56) References Cited

U.S. PATENT DOCUMENTS

| | | | | |
|---|---|---|---|---|
| 2,630,888 A * | 3/1953 | Fikse | ............ | B60T 7/20 188/112 R |
| 2,648,407 A * | 8/1953 | Schwertner | ............ | B60T 7/20 188/112 R |
| 2,698,069 A * | 12/1954 | Henry | ............ | B60T 11/107 188/112 R |
| 2,830,851 A * | 4/1958 | McClure | ............ | B60T 15/306 303/22.6 |
| 2,841,448 A * | 7/1958 | Weber | ............ | B60T 15/306 303/46 |
| 2,960,194 A | 11/1960 | Stromberg | | |
| 3,007,552 A * | 11/1961 | Eksergian | ............ | B60T 7/20 188/112 R |
| 3,272,563 A * | 9/1966 | May | ............ | B60T 13/465 251/251 |
| 3,323,619 A * | 6/1967 | Lacy | ............ | B60T 7/20 188/112 R |
| 3,448,834 A * | 6/1969 | Lammers | ............ | B60T 11/107 188/112 R |
| 3,570,633 A * | 3/1971 | Garnett | ............ | B60T 11/107 188/112 R |
| 4,181,367 A * | 1/1980 | Herring | ............ | B60T 15/46 188/DIG. 1 |
| 4,889,212 A | 12/1989 | Temple | | |
| 5,249,125 A * | 9/1993 | Root | ............ | B60T 17/228 246/182 B |
| 5,346,289 A * | 9/1994 | Cords | ............ | B60T 7/20 188/150 |
| 5,551,539 A * | 9/1996 | Frymiare | ............ | B60T 7/20 188/112 R |
| 5,855,418 A * | 1/1999 | Greaves, Jr. | ............ | B60T 7/20 280/428 |
| 7,806,240 B2 | 10/2010 | Walstrom et al. | | |
| 8,267,485 B2 | 9/2012 | Barlsen et al. | | |
| 8,540,323 B2 | 9/2013 | Broch et al. | | |
| 8,708,112 B2 | 4/2014 | Maisonneuve | | |
| 2009/0050419 A1* | 2/2009 | Walstrom | ............ | B60T 11/107 188/112 R |

OTHER PUBLICATIONS

Canadian Office Action dated Jan. 15, 2018 for Application No. CA 2,948,947, 3 pgs.

* cited by examiner

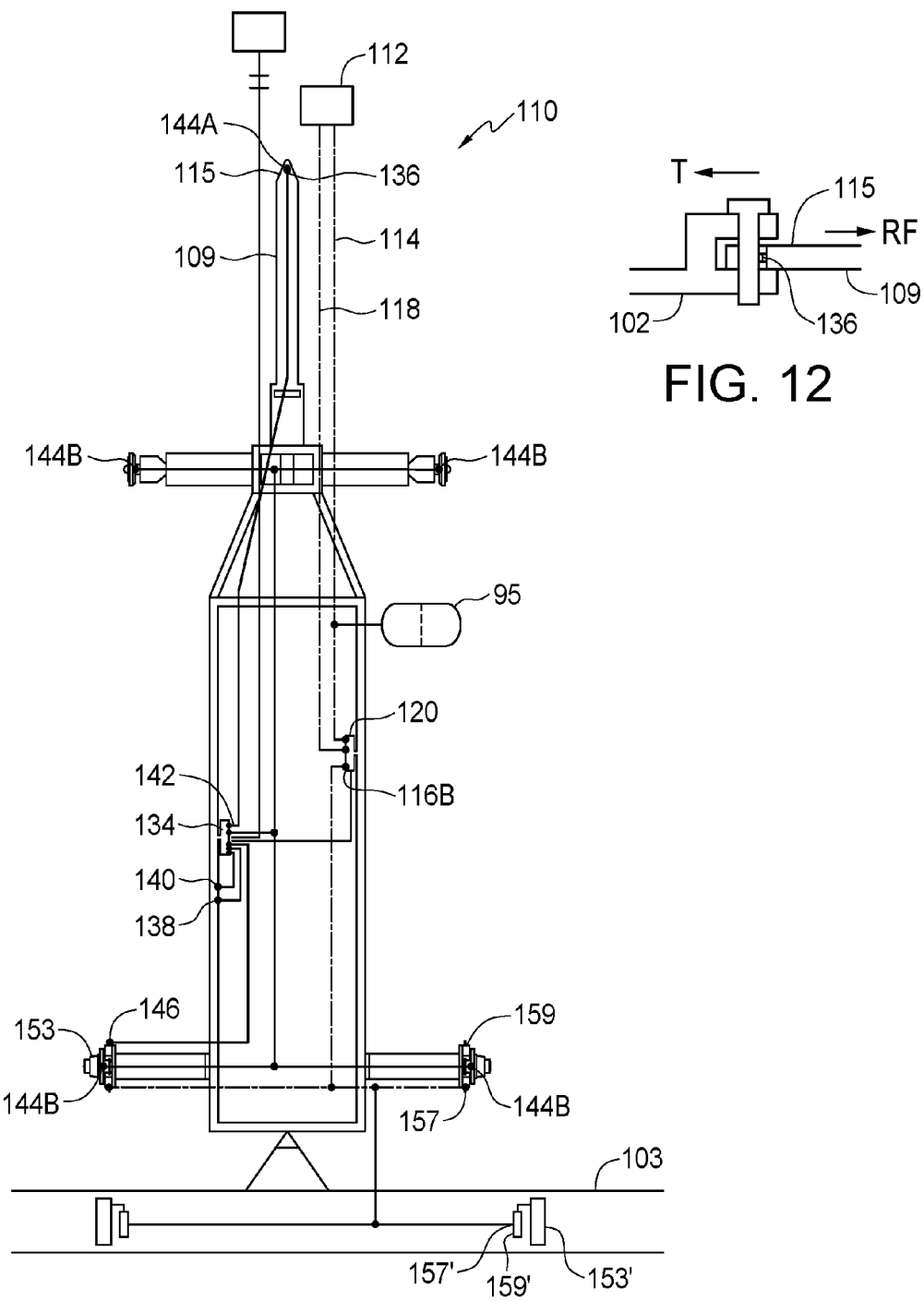

BRAKING SYSTEM FOR TOWED VEHICLES

CROSS-REFERENCE TO RELATED APPLICATION

This application claims priority to and benefit of Canadian Application Serial No. 2889117 filed Apr. 22, 2015, the contents of which are incorporated herein in its entirety for all purposes.

FIELD OF THE INVENTION

This disclosure relates to the field of towing vehicles and in particular a braking system for towed vehicles.

BACKGROUND

Braking systems are required for towed vehicles such as trailers and the like where the brakes of the towing vehicle are not sufficient to provide adequate braking for the added weight of the towed vehicle.

Surge or inertial braking systems use the force exerted by the towed vehicle on the towing vehicle through the tow hitch apparatus to activate brakes on the towed vehicle. Such surge braking systems are disclosed for example in U.S. Pat. No. 4,889,212 to Temple, U.S. Pat. No. 7,806,240 to Walstrom, et al., and U.S. Pat. No. 8,708,112 to Maisonneuve.

Electronic braking systems for towed vehicles are also known where a variety of sensors determines when braking of the towed vehicle is required, and activates the towed vehicle brakes. Such electronic braking systems are disclosed for example in U.S. Pat. No. 8,267,485 to Barlsen, et al. and U.S. Pat. No. 8,540,323 to Broch, et al.

Large agricultural air seeders typically include a product cart carrying product tanks that, when full of agricultural products, weigh well over twice as much as the tractor towing the air seeder. Larger product carts are sometimes mounted on tracks to reduce soil compaction. The product cart can be towed either behind the furrow opener implement of the air seeder, or between the furrow opener implement and the tractor, such that a train of towed vehicles is formed. In addition to the product cart and furrow opener, it is common to add another tank specifically for carrying fertilizer in its gaseous or liquid form. Braking systems are necessary to control the train, particularly during transport when the equipment is rolling freely behind the tractor on inclined ground surfaces.

A train including a product cart, furrow opener implement, and extra fertilizer tank can outweigh the towing tractor by over 1.5 times when empty and when this heavy train is being towed at high transport speeds, it can cause control issues. Due to the heavy weight of the unloaded train and the high transport speeds that can be achieved, an unloaded implement train can still be hazardous. Because of the heavy weight of the cart and the considerable distance between the tractor as a braking power source and the cart, providing effective braking for air seeders using conventional towed vehicle braking systems is problematic.

SUMMARY OF THE INVENTION

The present disclosure provides a braking system for towed vehicles that overcomes problems in the prior art.

In a first embodiment the present disclosure provides a towed vehicle apparatus comprising a hitch tongue for connecting a towed vehicle to the tow hitch of a towing vehicle for movement in an operating travel direction. The hitch tongue comprises a front tongue member with a front end thereof configured to engage the tow hitch and a rear tongue member attached to a front end of the towed vehicle, and the front tongue member is telescopically connected to the rear tongue member such that the front tongue member is movable in the operating travel direction with respect to the rear tongue member from a fully extended position when the towing vehicle is exerting a towing force in the operating travel direction, to a fully retracted position. A front cylinder lug extends outward from the front tongue member and a rear cylinder lug extends outward from the rear tongue member. An extendable master cylinder has a first end thereof connected to the front cylinder lug and a second end thereof connected to the rear cylinder lug such that a rearward force urging the front tongue member toward the fully retracted position forces pressurized braking fluid out of a pressurized fluid port of the master cylinder. A braking circuit is connected to the pressurized fluid port of the master cylinder and configured such that pressurized braking fluid expelled from the pressurized fluid port exerts a braking force on wheels of the towed vehicle.

The towed vehicle apparatus of the present disclosure provides a smoothly functioning sliding hitch tongue that serves to operate a master cylinder for actuating a brake cylinder for use with very large towed vehicles with weights in excess of 50 or 60 tons. Maintenance is simplified by having the master cylinder fully exposed, and by providing a removable bushing section that facilitates bushing replacement.

In a second embodiment the present disclosure provides a braking system for a towed vehicle, the towed vehicle including a hitch tongue adapted for connection at a front end thereof to a towing vehicle. The system comprises an extendable master cylinder comprising a pressurized fluid port at a first end thereof and a reservoir port at a second end thereof, the master cylinder mounted in the hitch tongue such that a rearward force urging the hitch tongue rearward exerts a corresponding force on the master cylinder and forces pressurized braking fluid out of a pressurized fluid port of the master cylinder. A brake conduit connects the pressurized fluid port of the master cylinder to an inlet of a brake cylinder, the brake cylinder operative to exert a braking force on wheels of the towed vehicle when pressurized braking fluid enters the inlet thereof. A first sequence valve in the brake conduit is configured to prevent flow through the brake conduit until pressurized braking fluid at the inlet thereof reaches a first pressure, and to open a path from the inlet thereof to an outlet thereof to allow braking fluid to flow through the brake conduit when pressurized braking fluid at the inlet thereof exceeds the first pressure. A first restrictive orifice is present in the brake conduit between the outlet of the first sequence valve and the inlet of the brake cylinder. A reversing valve in the brake conduit is configured such that when a reversing control is in a braking position, the reversing valve provides a path from the inlet thereof to an outlet thereof such that pressurized braking fluid flows through the brake conduit, and when the reversing control is in a reversing position the reversing valve closes the path from the inlet thereof to the outlet thereof, and provides a path from the outlet thereof to a fluid reservoir such that pressurized braking fluid at the inlet of the brake cylinder is relieved to a fluid reservoir. A first return conduit is connected at one end to the brake conduit between the first restrictive orifice and the inlet of the brake cylinder, and is connected at an opposite end thereof to the pressurized fluid port of the master cylinder, and a first check valve in the first return conduit is configured to allow braking fluid flow from the inlet of the brake cylinder to the pressurized fluid port of the master cylinder, and to prevent braking fluid flow from the pressurized fluid port of the master cylinder to the inlet of the brake cylinder. A second return conduit connects the fluid reservoir to the pressurized fluid port of the master cylinder, and a second check valve in the second return conduit is configured to allow braking fluid flow from the fluid reservoir to the pressurized fluid port of the master cylinder, and to prevent braking fluid flow from the pressurized fluid port of the master cylinder to the fluid reservoir. A reservoir conduit connects the reservoir port of the master cylinder to the fluid reservoir.

The braking system prevents braking during gradual slowing down of the towing vehicle, or on shallow inclines, provides dampening of the brake action, and allows for the operator to reverse the towed vehicle without the brakes being activated. Emergency stopping and dampening of sliding movement of the hitch tongue are provided as well.

In a third embodiment the present disclosure provides a braking system for an air seeder, where the air seeder includes a towed vehicle with a hitch tongue extending forward from the towed vehicle and adapted at a front end thereof for connection to a towing vehicle. The system comprises a brake cylinder operative to exert a braking force on wheels of the air seeder when pressurized braking fluid enters an inlet thereof, wherein the braking force increases as a pressure of the pressurized braking fluid increases, and a pressurized braking fluid source. A proportional valve is connected at an input thereof to the pressurized braking fluid source and connected at an output thereof to the inlet of the brake cylinder. The proportional valve is operative to reduce an input braking fluid pressure at the input thereof to a selected output pressure at the output thereof. A sensor apparatus is operative to detect a braking requirement for the towed vehicle, and a control module is operative to receive sensor information from the sensor apparatus and operative to vary the output pressure at the output of the proportional valve in response to received sensor information to achieve the selected output pressure that causes the brake cylinder to exert the braking force that meets the braking requirement.

The braking system provides smooth braking action by sensing what the towed vehicle is doing, and applying brake force as required in response. The system requires no moving parts that can be damaged by large forces encountered where, for example the product cart is towed between the tractor and the furrow opener implement.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 11 is a top view of an alternate brake circuit suited for use on, and shown installed on the air seeder product cart of FIG. 9, with tanks of the product cart removed for illustration;

FIG. 12 is a schematic sectional side view of the force sensor of the brake circuit of FIG. 11 that is operative to sense a rearward force exerted on the hitch tongue;

DETAILED DESCRIPTION OF THE ILLUSTRATED EMBODIMENTS

Figure 1:
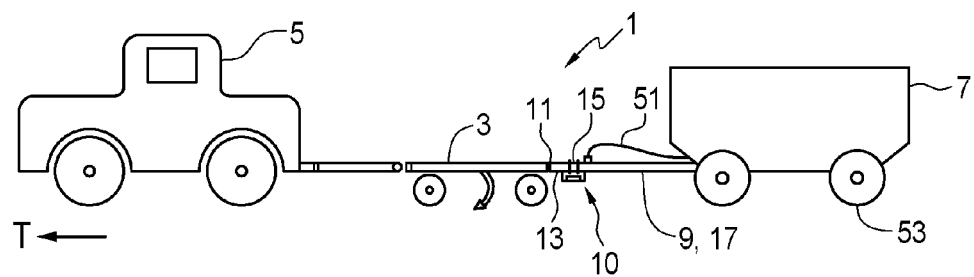
FIG. 1 is a schematic side view of an embodiment of the towed vehicle apparatus of the present disclosure, where the towed vehicle is a product cart towed at the rear end of an air seeder.
Figure 2:
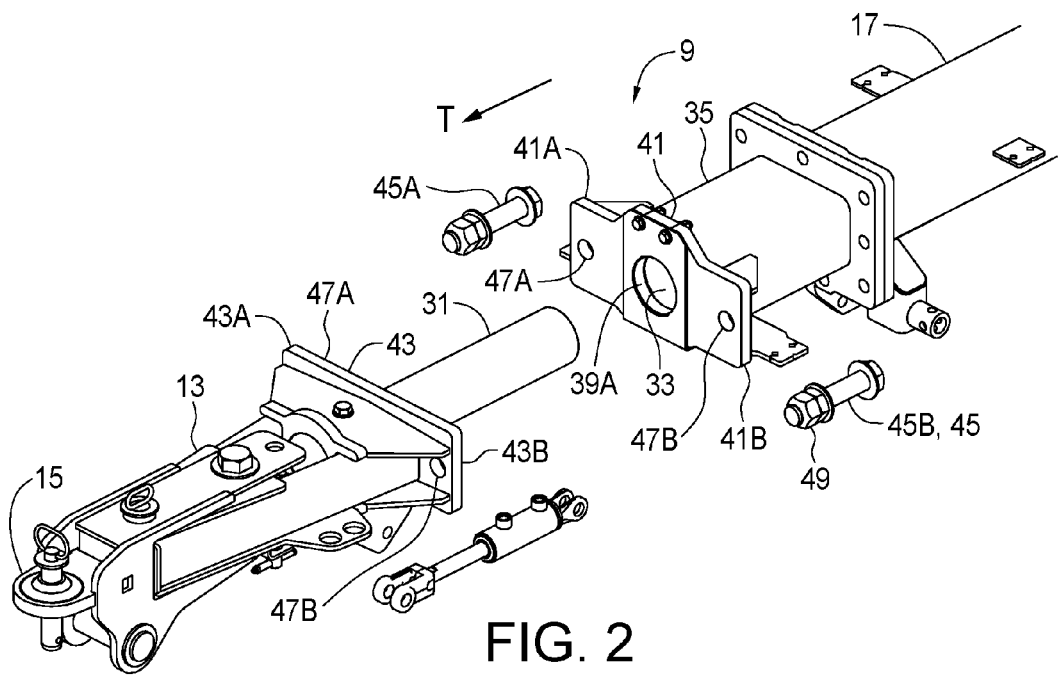
FIG. 2 is a perspective exploded view of the hitch tongue of the embodiment of FIG. 1.

FIG. 1 schematically illustrates a common configuration of an air seeder 1 where the furrow opener implement 3 is towed behind the tractor 5 and the product cart 7 is towed behind the furrow opener implement 3.

An embodiment of a towed vehicle apparatus 10 of the present disclosure is installed on the hitch tongue 9 that connect the towed vehicle, here being the product cart 7, to the tow hitch 11 of a towing vehicle, here being the furrow opener implement 3, for movement in an operating travel direction T. As illustrated in FIGS. 2-6, the hitch tongue 9 comprises a front tongue member 13 with a front end 15 thereof configured to engage the tow hitch 11, and a rear tongue member 17 attached to a front end of the product cart 7.

Figure 5:
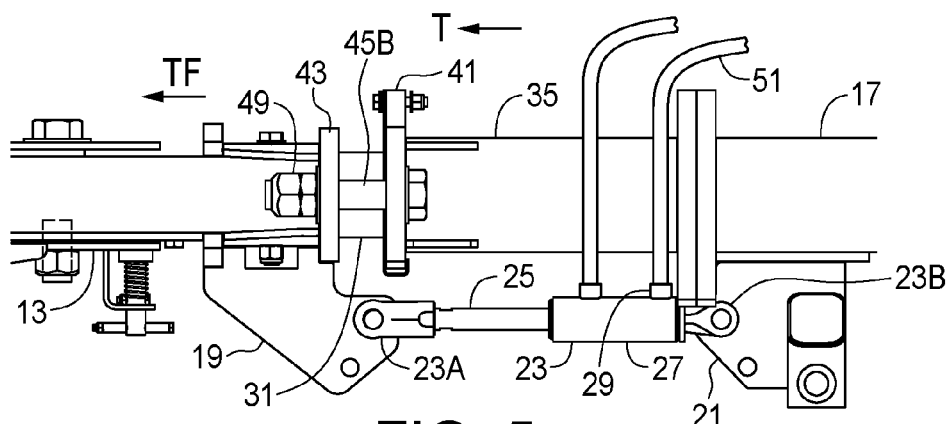
FIG. 5 is a side view of the hitch tongue of FIG. 2 with the front tongue member in the fully extended position.
Figure 6:
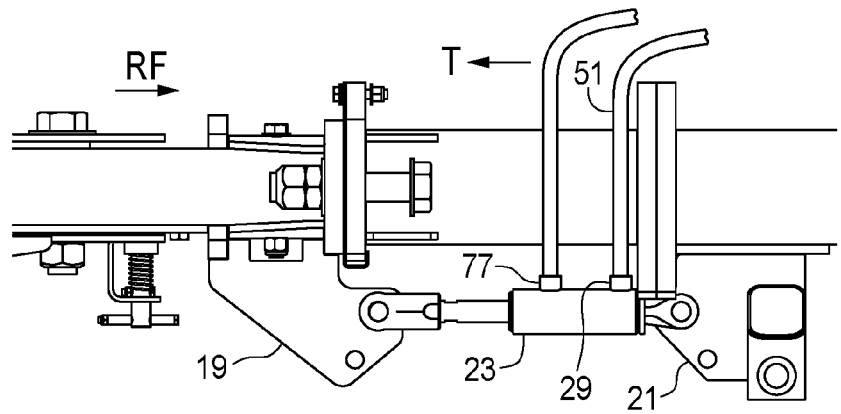
FIG. 6 is a side view of the hitch tongue of FIG. 2 with the front tongue member in the fully retracted position.

In the illustrated hitch tongue 9 the front tongue member 13 is telescopically connected to the rear tongue member 17 such that the front tongue member 13 is movable in the operating travel direction T with respect to the rear tongue member 17 from the fully extended position shown in FIG. 5 when the furrow opener implement 3 is exerting a towing force TF in the operating travel direction T to a fully retracted position shown in FIG. 6.

A front cylinder lug 19 extends outward from the front tongue member 13 and a rear cylinder lug 21 extends outward from the rear tongue member 17, and an extendable master cylinder 23 has a first end 23A thereof connected to the front cylinder lug 19 and a second end 23B thereof connected to the rear cylinder lug 21. With the telescoping arrangement of the front and rear tongue members 13, 17 a rearward force RF urging the front tongue member 13 toward the fully retracted position pushes the rod 25 of the master cylinder 23 into the barrel 27 of the master cylinder 23 and forces pressurized braking fluid out of the pressurized fluid port 29 of the master cylinder 23.

Figure 3:
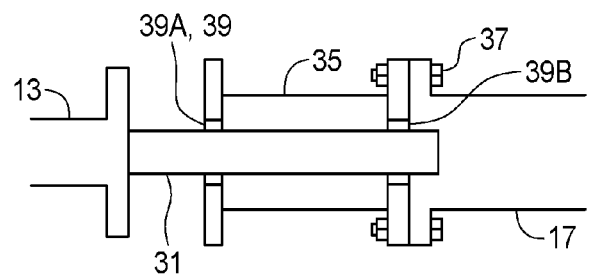
FIG. 3 is a schematic sectional view of the bushing section of the embodiment of FIG. 1 with the shaft of the front tongue member inserted in the cylindrical aperture defined by the front and rear bushings.
Figure 4:
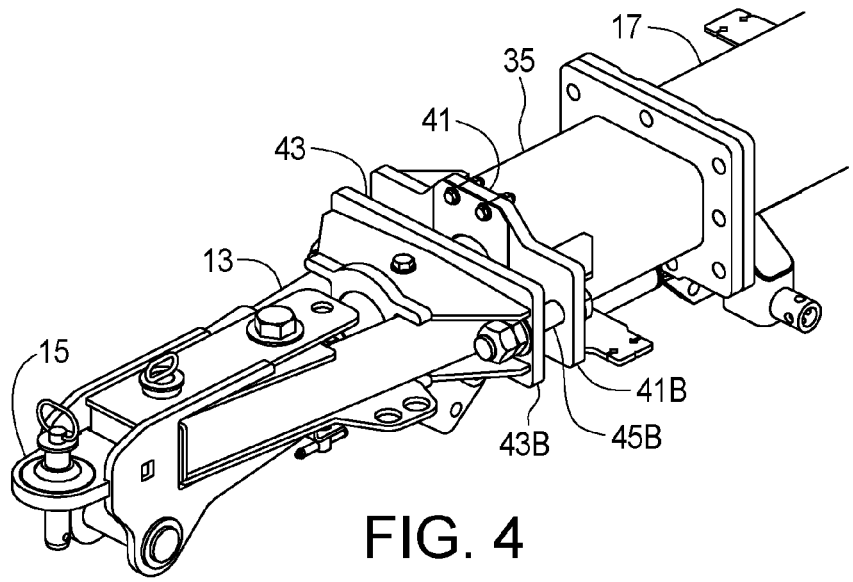
FIG. 4 is a schematic assembled view of the hitch tongue of FIG. 2.

The product cart 7 can weigh well over 100,000 pounds when full and so very large forces are exerted on the hitch tongue 9, and the telescoping mechanism must be strong enough to resist deformation in response to these forces. In the illustrated apparatus 10 the front tongue member 13 comprises a cylindrical shaft 31 which is slidingly engaged in a cylindrical aperture 33 defined in the rear tongue member 17. The rear tongue member 17 has a bushing section 35 attached to the front end thereof by removable fasteners, illustrated as bolts 37. The bushing section 35 defines the cylindrical aperture 33 with a first bushing 39A mounted at a front end of the bushing section 35 and a second bushing 39B mounted at a rear end of the bushing section 35. FIG. 3 schematically illustrates the shaft 31 inserted in the bushings 39.

The cylindrical shape of the shaft 31 and the corresponding holes in the bushings 39 allows for these mating parts to be machined to close tolerances to form an engagement with little lateral movement. In use on a large product cart 7 weighing perhaps 120,000 pounds when full the shaft 31 can be about 4.5 inches in diameter and the close tolerances facilitated by the circular shape reduce lateral movement to a minimum.

Maintenance of the apparatus 10 is facilitated by the exposed location of the master cylinder where removal and replacement can be done simply by removing the pins holding it in place. Similarly the rear bushing 39B can be easily accessed and replaced by removing the bolts 37 attaching the bushing section 35 to the rear tongue member 17.

To define the range of telescoping travel of the front tongue member 13 with respect to the rear tongue member 17 a rear bearing plate 41 is attached to the front end of the bushing section 35. The rear bearing plate 41 includes first and second rear fastener portions 41A, 41B extending outward from opposite sides of the bushing section 35, and a front bearing plate 43 attached to a rear end of the front tongue member 13 includes first and second front fastener portions 43A, 43B extending outward from opposite sides of the front tongue member 13. A first fastener, illustrated as bolt 45A extends through corresponding fastener holes 47A in the first front and rear fastener portions 41A, 43A on a first side of the shaft 31 and a second fastener, illustrated as bolt 45B extends through corresponding fastener holes 47B in the second front and rear fastener portions 41B, 43B on a second side of the shaft 31.

The fastener bolts 45A, 45B are slidingly engaged in the fastener holes 47A, 47B and include a fastener stop on each end thereof, provided by the head of each bolt 45 and a corresponding nut 49, configured to bear against the bearing plates 41, 43 when the front tongue member 13 is in the fully extended position as illustrated in FIG. 5. The front tongue member 13 slides back freely on the bolts 45 from the fully extended position toward the fully retracted position of FIG. 6 in response to a rearward force RF exerted thereon, such as when the towing vehicle, here illustrated as furrow opener implement 3, slows down faster than the product cart 7, or when the product cart 7 is on a downward incline pushing against the furrow opener implement 3.

The towed vehicle apparatus 10 of the present disclosure provides a smoothly functioning sliding hitch tongue 9 that serves to operate a master cylinder for actuating a brake cylinder for use with very large towed vehicles with weights in excess of 50 or 60 tons. Maintenance is simplified by having the master cylinder fully exposed, and by providing a removable bushing section 35 that facilitates bushing replacement.

Figure 7:
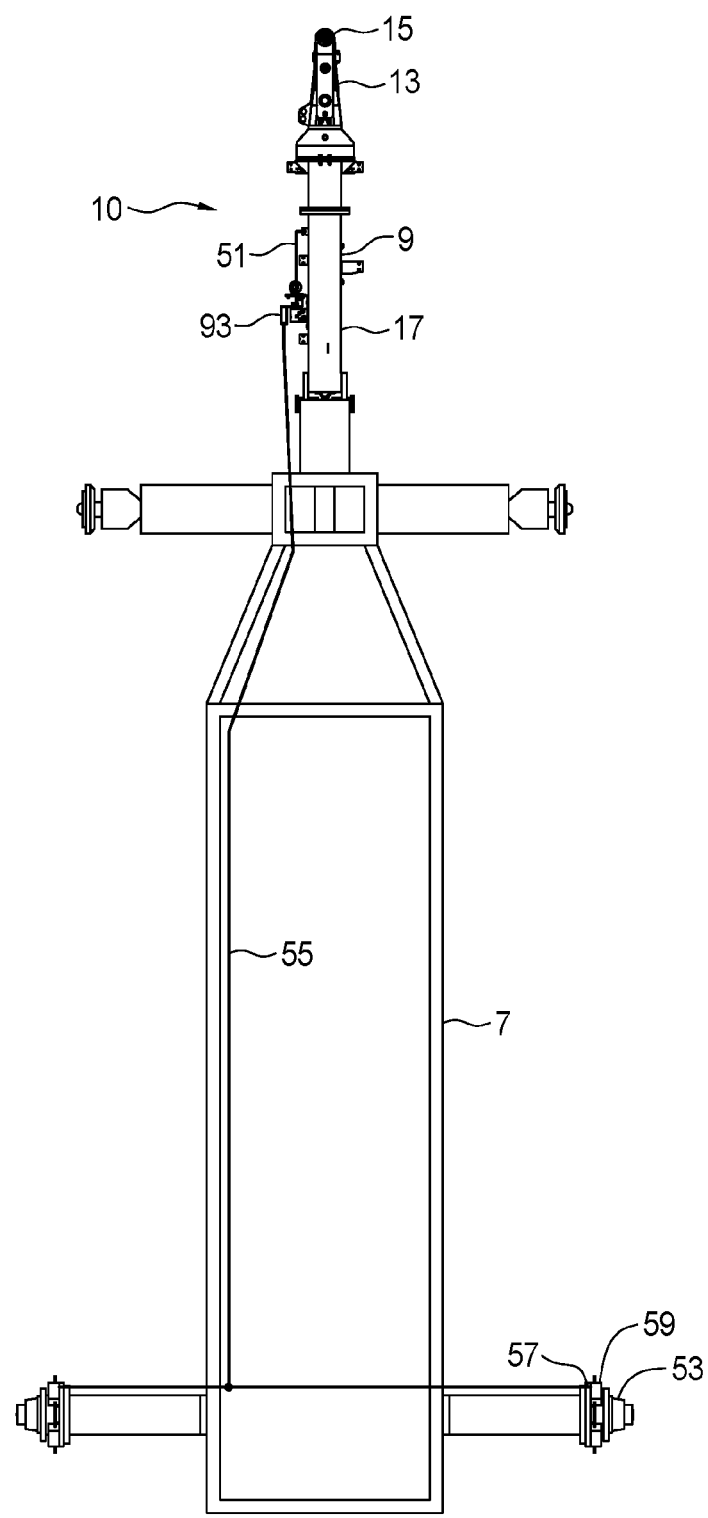
FIG. 7 is a top view of the brake circuit of the embodiment of FIG. 1 installed on the product cart, with tanks of the product cart removed for illustration.

A braking circuit 51, schematically shown on the product cart 7 in FIG. 7, is connected to the pressurized fluid port 29 of the master cylinder 23 and is configured such that pressurized braking fluid expelled from the pressurized fluid port 29 exerts a braking force on wheels 53 of the product cart 7. More typically it is contemplated the braking fluid used will be a liquid braking fluid however a gaseous fluid such as air, could be used as well. Also in larger product carts tracks are sometimes mounted on the wheels 53 to reduce soil compaction.

Figure 8:
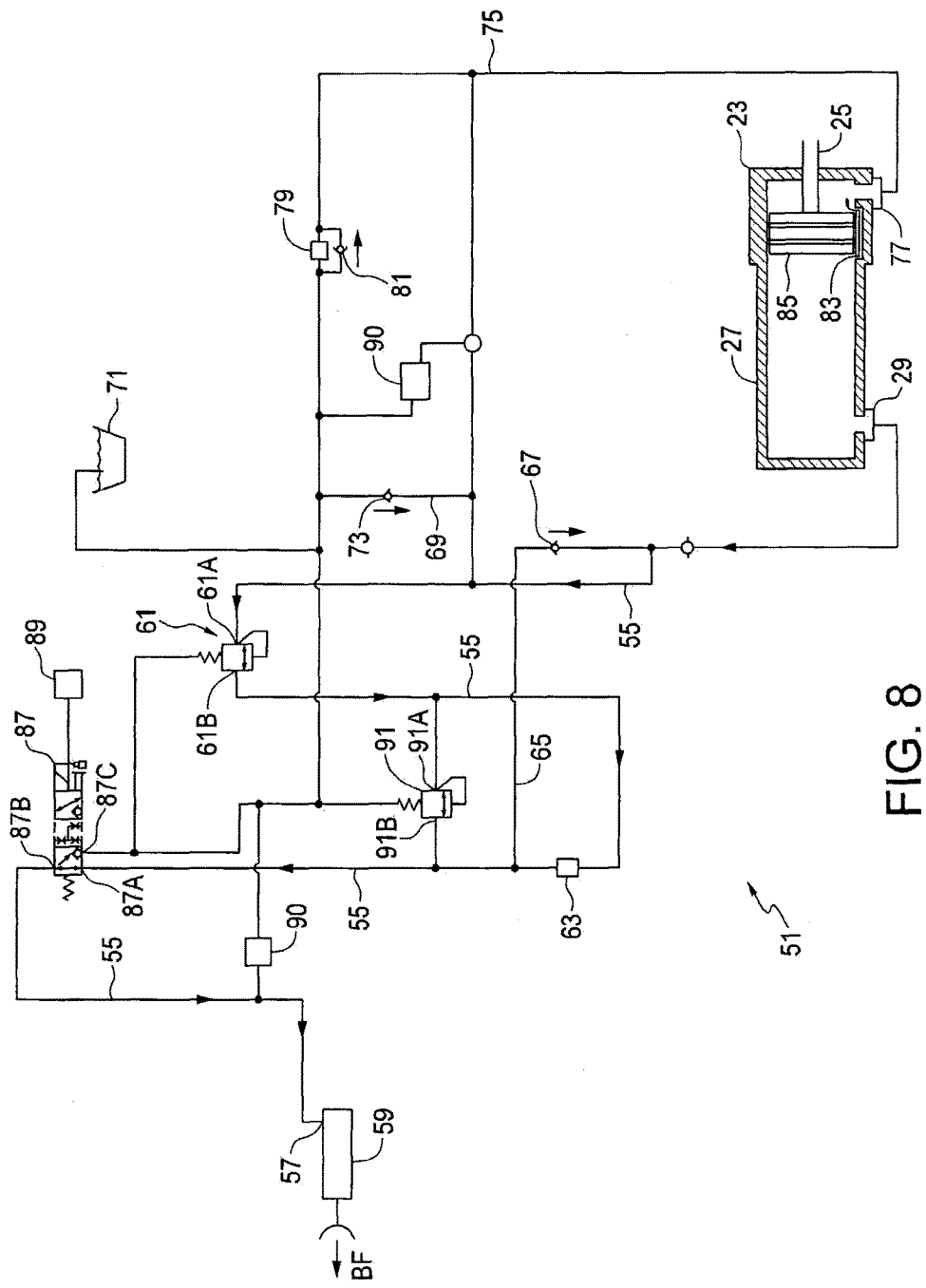
FIG. 8 is a schematic view of the braking circuit of the embodiment of FIG. 1.

A braking system is schematically illustrated in FIG. 8 that is suited for use with the towed vehicle apparatus 10 where the towed vehicle product cart 7 has a hitch tongue adapted for connection at a front end thereof to a towing vehicle, and where an extendable master cylinder 23, with a pressurized fluid port 29, is mounted in the hitch tongue 9 such that a rearward force urging the hitch tongue 9 rearward exerts a corresponding force on the master cylinder and forces pressurized braking fluid out of the pressurized fluid port 29 of the master cylinder 23.

A brake conduit 55 connects the pressurized fluid port 29 of the master cylinder 23, on the path indicated by the arrows, to an inlet 57 of a brake cylinder 59 and the brake cylinder 59 is operative to exert a braking force on the wheels 53 of the product cart 7 when pressurized braking fluid enters the inlet 57.

In order to reduce undue wear on the brakes, the braking circuit 51 is configured such that when the rearward force RF urging the front tongue member 13 toward the fully retracted position is less than an activation force, no braking force is exerted on the wheels 53. For example when the tractor 5 and furrow opener implement 3 are slowing gradually, there is no need for braking the cart wheels 53.

To provide this feature a first sequence valve 61 in the brake conduit 55 is configured to prevent flow through the brake conduit 55 until pressurized braking fluid at the inlet 61A of the first sequence valve 61 reaches a first selected pressure, and to open a path from the inlet 61A thereof to the outlet 61B of the first sequence valve 61 to allow braking fluid to flow through the brake conduit 55 when pressurized braking fluid at the inlet 61A thereof exceeds the first selected pressure. The pressure is selected to allow flow through the brake conduit 55 when the rearward force RF, which generates the pressure, equals the activation force, which force is large enough to indicate the tractor 5 is slowing more quickly, or the product cart 7 is on a steep incline, and braking of the wheels 53 on the product cart is required.

Once the rearward force RF equals the activation force, braking fluid begins to flow through the brake conduit 55 to the brake cylinder 59 and an initial braking force BF is exerted on the wheels 53, and as the rearward force RF increases, the pressure of the braking fluid increases and the braking force BF correspondingly increases.

The braking circuit 51 is configured to direct pressurized braking fluid through a first restrictive orifice 63 in the brake conduit 55 between the outlet 61B of the first sequence valve 61 and the inlet 57 of the brake cylinder 59. The first restrictive orifice 63 restricts the flow of braking fluid though the brake conduit 55 and reduces the rate of increase in the braking force BF to a rate that is less than a rate of increase in the rearward force RF. This arrangement dampens the pressure fluctuations at the brake cylinder and makes the operation of the brakes smoother.

The braking circuit 51 includes a first return conduit 65 connected at one end to the brake conduit 55 between the first restrictive orifice 63 and the inlet 57 of the brake cylinder 59, and connected at an opposite end thereof to the pressurized fluid port 29 of the master cylinder 23. A first check valve 67 in the first return conduit 65 is configured to allow braking fluid flow from the inlet 57 of the brake cylinder 59 back to the pressurized fluid port 29 of the master cylinder 23, and to prevent braking fluid flow from the pressurized fluid port 29 of the master cylinder 23 to the inlet 57 of the brake cylinder 59.

A second return conduit 69 connects a fluid reservoir 71 to the pressurized fluid port 29 of the master cylinder 23, and a second check valve 73 in the second return conduit 69 is configured to allow braking fluid flow from the fluid reservoir 71 to the pressurized fluid port 29 of the master cylinder 23, and to prevent braking fluid flow from the pressurized fluid port 29 of the master cylinder 23 to the fluid reservoir 71.

The pressurized fluid port 29 is defined in the blind end of a barrel 27 of the master cylinder 23, and a reservoir port 77 is defined in the rod end of the barrel 27. A reservoir conduit 75 connects the reservoir port 77 of the master cylinder 23 to the fluid reservoir 71. When the rearward force RF is no longer present and a towing force TF is exerted on the hitch tongue 9 the master cylinder 23 moves to the extended position drawing braking fluid from the brake cylinder 59 and the reservoir 71 into the blind end of the barrel 27 through the pressurized fluid port 29 and pushing braking fluid out of the rod end of the master cylinder 23 through the reservoir port 77. The force on the hitch tongue 9 can change quickly from a rearward force RF to a significant level of towing force TF causing braking fluid to be pushed out of the reservoir port 77 quickly and at high pressure.

To smooth the operation of the master cylinder 23, a second restrictive orifice 79 is placed in the reservoir conduit 75 which restricts and slows flow of braking fluid out of the reservoir port 77. A third check valve 81 is connected to the reservoir conduit 75 in parallel with the second restrictive orifice 79 and is configured such that braking fluid flowing from the fluid reservoir 71 to the reservoir port 77 flows through the third check valve 81, and braking fluid flowing from the reservoir port 77 to the fluid reservoir 71 is prevented from flowing through the third check valve 81 and must flow through the second restrictive orifice 81.

When the master cylinder 23 is in the extended position as seen in FIG. 8, a path 83 is opened around the piston 85 to allow braking fluid to flow between the pressurized fluid port 29 and the reservoir port 77. This feature ensures there is no pressure trapped in the brake conduit 55 and thus in the brake cylinder 59, when in the normally operated towing position.

It is commonly necessary to reverse towed vehicles, such as the product cart 7. The braking circuit 51 includes a reversing valve 87 in the brake conduit 55 configured such that when a reversing control 89, typically located at the operator's station on the tractor 5, is in a braking position, the reversing valve 87 provides a path from the inlet 87A thereof to the outlet 87B thereof such that pressurized braking fluid flows through the brake conduit 55 to the brake cylinder 59. When the reversing control 89 is in a reversing position the reversing valve 87 closes the path from the inlet 87A thereof to the outlet 87B thereof, preventing braking fluid from passing to the brake cylinder 59, and provides a path from the outlet 87B to a relief port 87C connected to the fluid reservoir 71 such that pressurized braking fluid at the inlet 57 of the brake cylinder 59 is relieved to the fluid reservoir 71 and negligible pressure is present in any brake fluid in the brake cylinder 59. Braking fluid forced out of the pressurized fluid port 29 when the rearward force RF is exerted to reverse the product cart 7, thus is blocked and does not get through to the brake cylinder 59.

When the reversing control 89 is in the reversing position the reversing valve 87 may also provide a path from the inlet 87A to the relief port 87C such that any pressurized braking fluid from the pressurized port 29 of the master cylinder 23 will also be diverted to the fluid reservoir 71. Thus there is no appreciable pressure present in the brake conduit 55.

In an emergency stopping situation, when the rearward force RF is greater than an emergency stopping force, an emergency valve opens allowing the braking fluid to bypass the first restrictive orifice 63 such that an emergency braking force is exerted substantially immediately on the wheels 53. The emergency valve is provided by a second sequence valve 91 in the brake conduit 55 configured to open a path from an inlet 91A thereof, connected to the brake conduit 55 between the outlet 61B of the first sequence valve 61 and the first restrictive orifice 63, to an outlet 91B thereof, connected to the brake conduit 55 between the first restrictive orifice 63 and the inlet 57 of the brake cylinder 59 when pressurized braking fluid at the inlet 91A thereof exceeds a second pressure emergency pressure that is greater than the first selected pressure which opens the first sequence valve 61. For example in one configuration the first pressure can be 700 pounds per square inch (psi) while the second pressure can be 2500 psi. The first and second pressure will be selected to suit the particular configuration of the towed vehicle apparatus 10. The valves and restrictive orifices can be mounted in a hydraulic module 93 on frame of the product cart 7. The restrictive orifices can be adjusted to vary the flow restriction to achieve a desired dampening effect.

Further pressure relief valves 90 connected to the fluid reservoir 71 will typically also be provided and calibrated to ensure fluid pressures do not exceed levels that could damage the components.

The braking system prevents braking during gradual slowing down of the towing vehicle, or on shallow inclines, provides dampening of the brake action, and allows for the operator to reverse the towed vehicle without the brakes being activated. Emergency stopping and dampening of sliding movement of the hitch tongue are provided as well.

A typical air seeder includes two or three towed vehicles, typically a furrow opener implement, product tank cart, and sometimes a fertilizer wagon, in a train behind a towing tractor, each with a hitch tongue extending forward from the towed vehicle and adapted at a front end thereof for connection to a towing vehicle, and the order of the vehicles in the train can vary from one air seeder to the next.

Figure 9:
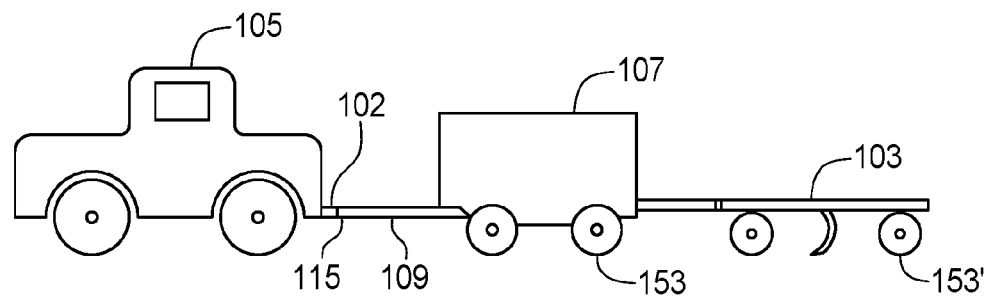
FIG. 9 is a schematic side view of an air seeder where the product cart is towed between the tractor and the furrow opener implement.

FIG. 9 schematically illustrates a common configuration of an air seeder that includes a product cart 107 with a hitch tongue 109 extending forward from the product cart and adapted for attachment at a front end 115 thereof to a towing tractor 105, and attached at a rear end thereof to a furrow opener implement 103. In this configuration the forces exerted on the hitch tongue 109 are considerably greater than the forces exerted on the hitch tongue 9 described above as the hitch tongue 109 carries the high draft forces required to tow the furrow opener implement 103 along the field with the furrow openers engaged in the ground. This configuration also often has a product cart with only two wheels such that considerable weight is carried by the hitch tongue bearing down on the drawbar 102 of the tractor. The sliding front and rear hitch tongue members 13 and 17 forming the hitch tongue 9 above, or any like arrangement with movable parts, would be problematic with the added forces required in this tow between tank configuration.

Figure 10:
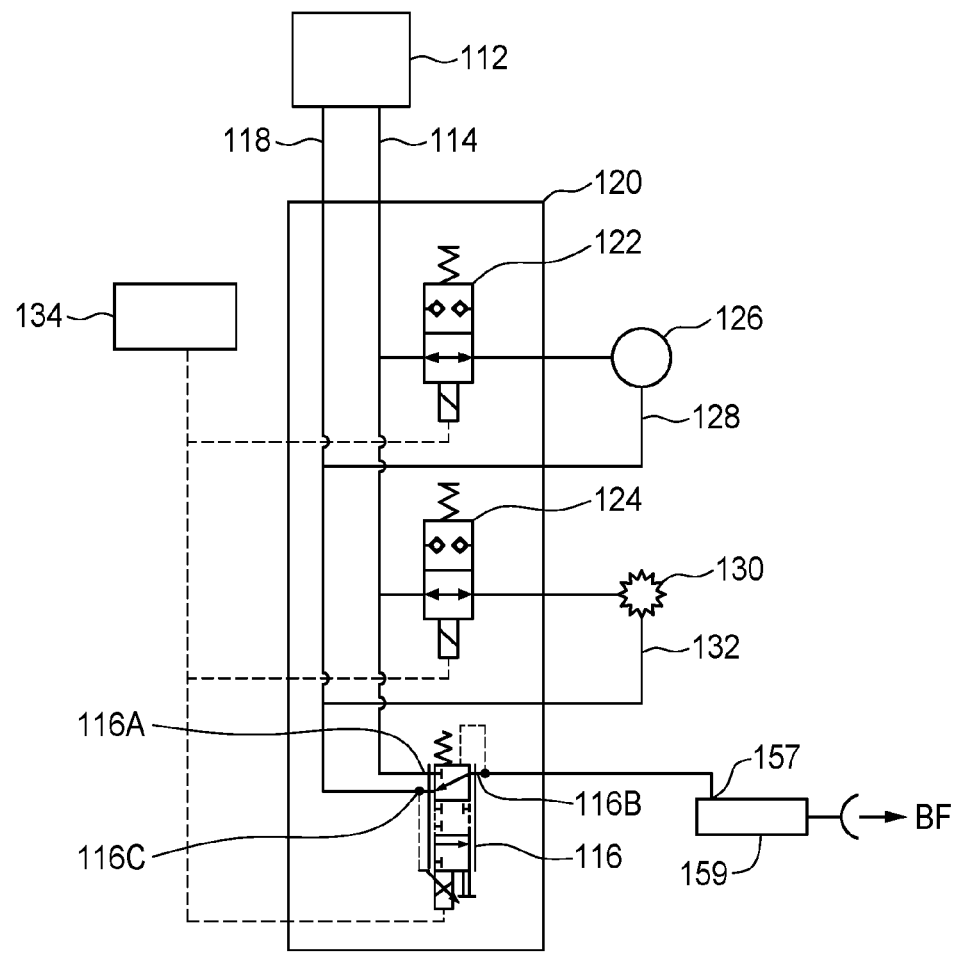
FIG. 10 is a schematic view of the control and circuits for an alternate braking system shown in FIG. 11.

FIGS. 10 and 11 schematically illustrate a braking system 110 for such a tow between tank configured air seeder. The system 110 comprises a brake cylinder 159 operative to exert a braking force BF on wheels 153 of the product cart 107, and on wheels 153' of the furrow opener implement 103 when pressurized braking fluid enters inlets 157, 157' of the brake cylinders 159, 159', and wherein the braking force BF increases as a pressure of the pressurized braking fluid increases. A pressurized braking fluid source 112 has a pressurized supply conduit 114 connected to the input 116A of a proportional valve 116. An output 116B of the proportional valve 116 is connected to the inlets 157, 157' of the brake cylinders 159, 159', and a relief port 116C of the proportional valve 116 is connected to a fluid reservoir, here illustrated as the return conduit 118 of the pressurized braking fluid source 112. The proportional valve 116 is operative to reduce an input braking fluid pressure at the input 116A thereof to a selected output pressure at the output 116B thereof.

The pressurized fluid source can conveniently be provided by the hydraulic system of the tractor 105. FIG. 10 schematically illustrates one suitable configuration using the tractor's hydraulic system where a hydraulic manifold 120 includes a fan valve 122, a meter valve 124, and the proportional valve 116. The fan valve 122 connects the pressurized supply conduit 114 to a fan 126 and a fan return conduit 128 provides a path for braking fluid to return from the fan 126 to the return conduit 118. The meter valve 124 connects the pressurized supply conduit 114 to a meter 130 and a meter return conduit 132 provides a path for braking fluid to return from the meter 130 to the return conduit 118.

A sensor apparatus can comprise a variety of sensors and is operative to detect a braking requirement for the product cart 107, and a control module 134 is operative to receive sensor information from the sensor apparatus and operative to vary the output pressure at the output 116B of the proportional valve 116 in response to received sensor information to achieve the selected output pressure that causes the brake cylinder 159 to exert the braking force BF that meets the braking requirement. The control module 134 is also operative to open and close the fan valve 122 and meter valve 124 to start or stop the fan 126 and product meter 130 so that the fan and meter can be stopped during transport while providing pressurized braking fluid to flow through the pressurized supply conduit 114 to the proportional valve 116 to operate the brakes.

In the illustrated braking system 110 instead of the detecting the rearward force on the hitch tongue indicating a braking requirement with a sliding tongue arrangement as described above, the sensor apparatus can comprise, as schematically illustrated in FIG. 12, a force sensor 136 between the drawbar 102 and front end of the hitch tongue 109 which is operative to detect the braking requirement by detecting when the rearward hitch force RF on the hitch tongue exceeds an activation hitch force. The activation hitch force corresponds to the rearward force that generates the first selected pressure required to open the first sequence valve 61 in the braking circuit 51 described above, and preventing brake activation until the rearward force reaches the activation hitch force reduces undue wear on the brakes in the same manner as described above.

When the rearward force RF reaches the activation hitch force the control module 134 varies the output pressure at the output 116B of the proportional valve 116 to provide the output pressure that causes the brake cylinder 159 to exert a braking force BF that maintains the rearward hitch force RF on the hitch tongue 109 between the activation hitch force and a selected maximum hitch force.

Alternatively the sensor apparatus can comprise a gyroscope 138 operative to sense an inclination of the product cart 107, an accelerometer 140 operative to sense acceleration of the product cart 107, and a weight sensor 142 operative to sense a weight of the product cart 107. To determine the total weight of the illustrated product cart 107 the weight sensor 142 includes a first load cell 144A operative to sense a weight supported by the front end of the hitch tongue load and second load cells 144B in the spindles of each wheel 153 that are operative to sense a weight supported by the wheels 153 of the product cart 107. A direct speed sensor 146, or GPS speed sensor or the like, is operative to sense a speed of the product cart 107.

The sensor apparatus detects the braking requirement by calculating from the sensor information that a forward force exerted by the hitch tongue 109 on the towing tractor 105 is greater than an activation hitch force. This forward force corresponds to the rearward force RF detected by the force sensor 136, but is calculated from the sensor information rather than being measured directly.

Again the control module 134 varies the output pressure at the output 116B of the proportional valve 116 to provide the output pressure that causes the brake cylinder 159 to exert a braking force BF that maintains the forward force exerted by the hitch tongue 109 on the towing tractor 105 between the activation hitch force and a selected maximum hitch force. In order to improve control, it is generally desirable to apply braking forces to the wheels of the last vehicle in the train, and FIG. 11 schematically shows the output 116B of the proportional valve 116 connected to brake cylinders 159' of the furrow opener implement 103 to apply braking forces to the wheels 153' thereof. Where the wheels 153' are large enough to provide sufficient braking it may be desirable that no braking force is applied to the wheels 153 of the product cart 107, and the output 116B of the proportional valve 116 is connected only to the brake cylinders 159' on the furrow opener implement 103.

FIG. 11 also schematically illustrates an accumulator 95 connected to the pressurized supply conduit 114. Pressurized fluid, liquid or air, can be stored in the accumulator under pressure to provide pressurized fluid for braking when the pressurized braking fluid source 112 is inactive. The pressurized fluid in the accumulator 95 can be used to provide a temporary parking brake.

The braking system 110 provides smooth braking action by sensing what the product cart 107 is doing, and applying brake force as required in response. The system 110 requires no moving parts that can be damaged by large forces encountered where, for example the product cart 107 is towed between the tractor 105 and the furrow opener implement 103. Braking forces can be applied to either the product cart 107 or the furrow opener implement 103 or both.

Figure 13:
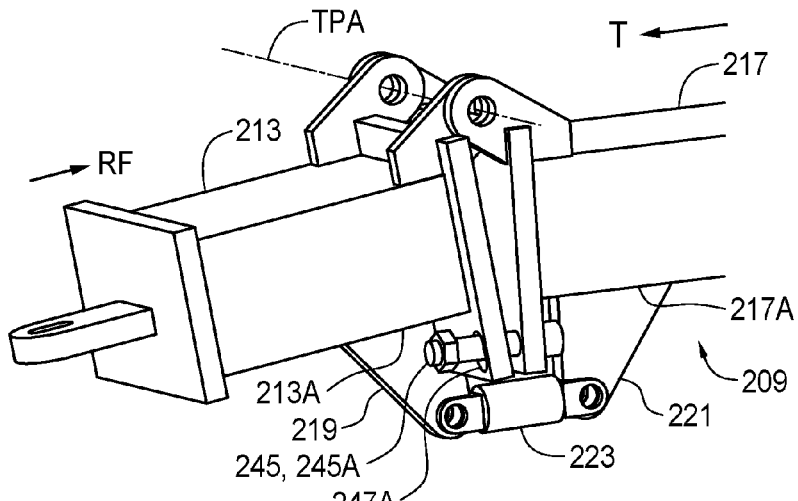
FIG. 13 is a schematic perspective view of an alternate arrangement of a hitch tongue for use with the embodiment of FIG. 1 with the front tongue member in the rearward position.
Figure 14:
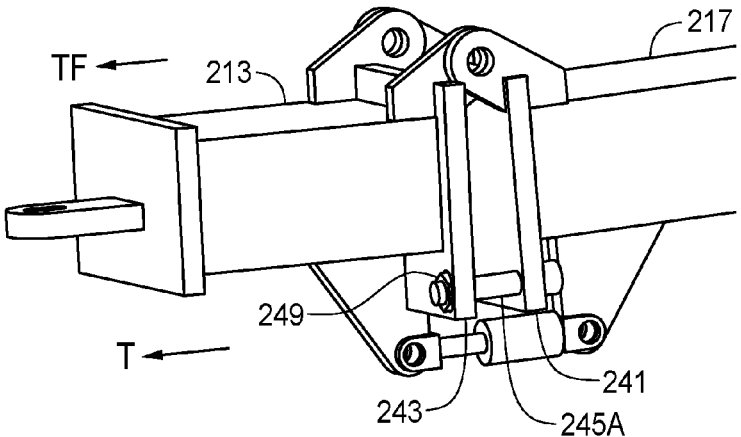
FIG. 14 is a schematic perspective view of the hitch tongue of FIG. 13 with the front tongue member in the forward position.
Figure 15:
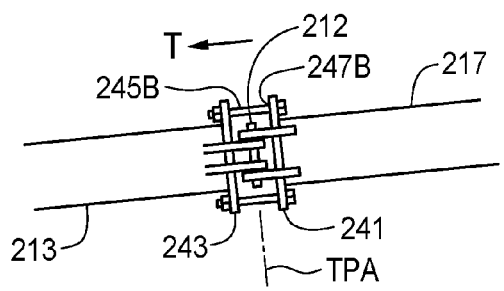
FIG. 15 is a schematic top view of the hitch tongue of FIG. 13 with the front tongue member in the forward position.

FIGS. 13-15 schematically illustrate an alternate arrangement of a hitch tongue 209 for use with the towed vehicle apparatus 10 of the present disclosure. The hitch tongue 209 comprises a front tongue member 213 pivotally connected to the rear tongue member 217 about a tongue pivot axis TPA defined by pin 212 oriented substantially perpendicular to the operating travel direction T such that a distal side 213A of the front tongue member 213 that is distal to the tongue pivot axis TPA pivots from a forward position, shown in FIG. 14, when the towing vehicle is exerting a towing force TF in the operating travel direction T, to a rearward position, shown in FIG. 13, when the towing vehicle is exerting a rearward force R. The front and rear cylinder lugs 219, 221, extend outward from the distal side 213A of the front tongue member 213 and a distal side 217A of the rear tongue member 217.

A front fastener portion 243 extends out from the front tongue member 213 and a rear fastener portion 241 extends out from the rear tongue member 217. A first fastener 245A extends through corresponding first fastener holes 247A in the front and rear fastener portions and a second fastener 245B extends through corresponding second fastener holes 247B in the front and rear fastener portions 241, 243.

The first and second fasteners 245A, 245B are, like the sliding fasteners 45A, 45B described above, slidingly engaged in the corresponding fastener holes 247A, 247B and include a fastener stop on each end thereof, provided by the head of each bolt 245 and a corresponding nut 249, configured to bear against the fastener portions 241, 243 when the front tongue member 213 is in the forward towing position of FIG. 14. The master cylinder 223 is extended in response to a towing force TF and retracted in response to a rearward force RF.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A towed vehicle apparatus comprising:
    a hitch tongue for connecting a towed vehicle to a tow hitch of a towing vehicle for movement in an operating travel direction;
    wherein the hitch tongue comprises a front tongue member with a front end thereof configured to engage the tow hitch and a rear tongue member attached to a front end of the towed vehicle;
    wherein the front tongue member is movably connected to the rear tongue member such that the front tongue member is movable in the operating travel direction with respect to the rear tongue member from a forward towing position when the towing vehicle is exerting a towing force in the operating travel direction, to a rearward braking position;
    a front cylinder lug extending outward from the front tongue member and a rear cylinder lug extending outward from the rear tongue member;
    an extendable master cylinder having a first end thereof connected to the front cylinder lug and a second end thereof connected to the rear cylinder lug such that a rearward force urging the front tongue member toward the fully retracted position forces pressurized braking fluid out of a pressurized fluid port of the master cylinder;
    a braking circuit connected to the pressurized fluid port of the master cylinder and configured such that pressurized braking fluid expelled from the pressurized fluid port exerts a braking force on wheels of the towed vehicle;
    wherein the front tongue member is telescopically connected to the rear tongue member and one of the front and rear tongue members comprises a cylindrical shaft slidingly engaged in a cylindrical aperture defined in the other of the front and rear tongue members; and
    the rear tongue member comprises a bushing section attached to a front end thereof by removable fasteners, the bushing section defining the cylindrical aperture with a first bushing mounted at a front end of the bushing section and a second bushing mounted at a rear end of the bushing section.

2. The apparatus of claim 1 comprising a rear bearing plate attached to the front end of the bushing section, the rear bearing plate including first and second rear fastener portions extending outward from opposite sides of the bushing section, and a front bearing plate attached to a rear end of the front tongue member, the front bearing plate including first and second front fastener portions extending outward from opposite sides of the front tongue member, and a first fastener extending through corresponding fastener holes in the first front and rear fastener portions on a first side of the shaft and a second fastener extending through corresponding fastener holes in the second front and rear fastener portions on a second side of the shaft.

3. The apparatus of claim 2 wherein the fasteners are slidingly engaged in the fastener holes and include a stop on each end thereof configured to bear against the bearing plates when the front tongue member is in the forward towing position.

4. The apparatus of claim 1 wherein the braking circuit is configured such that when the rearward force urging the front tongue member toward the rearward braking position is less than an activation force, no braking force is exerted on the wheels of the towed vehicle.

5. The apparatus of claim 4 wherein the braking circuit is configured such that when the rearward force urging the front tongue member toward the rearward braking position is substantially equal to the activation force, an initial braking force is exerted on the wheels of the towed vehicle, and as the rearward force increases, the braking force increases.

6. A towed vehicle apparatus comprising:
    a hitch tongue for connecting a towed vehicle to a tow hitch of a towing vehicle for movement in an operating travel direction;
    wherein the hitch tongue comprises a front tongue member with a front end thereof configured to engage the tow hitch and a rear tongue member attached to a front end of the towed vehicle;
    wherein the front tongue member is movably connected to the rear tongue member such that the front tongue member is movable in the operating travel direction with respect to the rear tongue member from a forward towing position when the towing vehicle is exerting a towing force in the operating travel direction, to a rearward braking position;
    a front cylinder lug extending outward from the front tongue member and a rear cylinder lug extending outward from the rear tongue member;
    an extendable master cylinder having a first end thereof connected to the front cylinder lug and a second end thereof connected to the rear cylinder lug such that a rearward force urging the front tongue member toward the fully retracted position forces pressurized braking fluid out of a pressurized fluid port of the master cylinder;
    a braking circuit connected to the pressurized fluid port of the master cylinder and configured such that pressurized braking fluid expelled from the pressurized fluid port exerts a braking force on wheels of the towed vehicle;

wherein the braking circuit is configured to direct pressurized braking fluid through a restrictive orifice to reduce a rate of increase in the braking force to a rate less than a rate of increase in the rearward force, and wherein when the rearward force is greater than an emergency stopping force, an emergency valve opens allowing the braking fluid to bypass the restrictive orifice such that an emergency braking force is exerted substantially immediately on the wheels of the towed vehicle.

\* \* \* \* \*